(12) United States Patent
Wang

(10) Patent No.: US 11,818,692 B2
(45) Date of Patent: Nov. 14, 2023

(54) WI-FI MANAGEMENT FRAME RECORDER

(71) Applicant: ARRIS Enterprises LLC, Suwanee, GA (US)

(72) Inventor: William Wang, Shenzhen (CN)

(73) Assignee: ARRIS ENTERPRISES LLC, Suwanee, GA (US)

(*) Notice: Subject to any disclaimer, the term of this patent is extended or adjusted under 35 U.S.C. 154(b) by 349 days.

(21) Appl. No.: 17/298,262

(22) PCT Filed: Jun. 2, 2020

(86) PCT No.: PCT/CN2020/093946
§ 371 (c)(1),
(2) Date: May 28, 2021

(87) PCT Pub. No.: WO2021/243567
PCT Pub. Date: Dec. 9, 2021

(65) Prior Publication Data
US 2022/0312410 A1    Sep. 29, 2022

(51) Int. Cl.
*H04W 72/0446* (2023.01)
*H04L 61/50* (2022.01)
(Continued)

(52) U.S. Cl.
CPC ......... *H04W 72/0446* (2013.01); *H04L 61/50* (2022.05); *H04W 24/08* (2013.01); *H04L 2101/622* (2022.05); *H04W 88/16* (2013.01)

(58) Field of Classification Search
None
See application file for complete search history.

(56) References Cited

U.S. PATENT DOCUMENTS

| 7,016,948 B1* | 3/2006 | Yildiz | H04L 43/18 709/224 |
| 8,750,185 B2* | 6/2014 | Seok | H04W 52/0235 370/392 |

(Continued)

FOREIGN PATENT DOCUMENTS

| CN | 103107927 | 5/2013 |
| CN | 105991313 | 10/2016 |

(Continued)

OTHER PUBLICATIONS

International Search Report and Written Opinion of the International Searching Authority dated Mar. 9, 2021, in International (PCT) Application No. PCT/CN2020/093946.

*Primary Examiner* — Christopher T Wyllie
(74) *Attorney, Agent, or Firm* — Wenderoth, Lind & Ponack, L.L.P.

(57) ABSTRACT

A system and method for operating a gateway device to enable monitoring a client device from an operator device via the gateway device. The gateway device being configured to transmit non-data frames associated with the client device to the operating device based on monitoring instructions and information retrieval instructions received from the operating device via a management information base. The gateway device including a memory and a processor configured to receive the monitoring instruction, set a MAC address associated with the client device, and monitor non-data frames based on the MAC address. The processor further being configured to record the non-data frames associated with the client device, store the recorded non-data frames in the memory, and transmit the recorded non-data frames to the operating device based on the received information retrieval instructions.

17 Claims, 11 Drawing Sheets

(51) Int. Cl.
  *H04W 24/08* (2009.01)
  *H04L 101/622* (2022.01)
  *H04W 88/16* (2009.01)

(56) References Cited

U.S. PATENT DOCUMENTS

| | | | |
|---|---|---|---|
| 10,531,363 B2* | 1/2020 | Townend | H04L 43/50 |
| 11,129,142 B1* | 9/2021 | Shukla | H04W 72/0446 |
| 2005/0141498 A1* | 6/2005 | Cam Winget | H04L 63/1408 |
| | | | 370/389 |
| 2006/0248429 A1* | 11/2006 | Grandhi | H04L 1/1664 |
| | | | 714/749 |
| 2008/0032727 A1* | 2/2008 | Stephenson | H04W 24/00 |
| | | | 455/513 |
| 2008/0205317 A1* | 8/2008 | Piipponen | H04W 16/14 |
| | | | 370/350 |
| 2009/0092051 A1* | 4/2009 | Miyata | H04L 67/61 |
| | | | 370/236 |
| 2009/0279521 A1* | 11/2009 | Ikeda | H04W 40/04 |
| | | | 370/338 |
| 2012/0008514 A1* | 1/2012 | Ponnuswamy | H04W 24/08 |
| | | | 370/252 |
| 2013/0159490 A1 | 6/2013 | Huh et al. | |
| 2013/0198383 A1* | 8/2013 | Tseng | H04W 12/088 |
| | | | 709/225 |
| 2013/0266136 A1* | 10/2013 | Chu | H04W 36/0033 |
| | | | 380/34 |
| 2015/0138013 A1* | 5/2015 | Lee | G01S 3/40 |
| | | | 342/351 |
| 2015/0271772 A1* | 9/2015 | Knowles | H04W 56/0015 |
| | | | 370/350 |
| 2016/0174233 A1* | 6/2016 | Emmanuel | H04W 52/243 |
| | | | 370/252 |
| 2017/0135145 A1* | 5/2017 | Amini | H04W 4/023 |
| 2017/0188376 A1* | 6/2017 | Noh | H04W 52/42 |
| 2018/0139756 A1* | 5/2018 | Hedayat | H04W 72/0453 |
| 2018/0310240 A1* | 10/2018 | Kannan | H04W 48/14 |
| 2020/0015181 A1* | 1/2020 | Patil | H04W 56/0015 |
| 2020/0296608 A1* | 9/2020 | Usaj | H04N 21/44227 |
| 2020/0351357 A1* | 11/2020 | Lee | H04L 67/51 |
| 2023/0189058 A1* | 6/2023 | Yeh | H04W 28/0865 |
| | | | 370/329 |

FOREIGN PATENT DOCUMENTS

| | | |
|---|---|---|
| CN | 107707444 | 2/2018 |
| CN | 110805991 | 2/2020 |

* cited by examiner

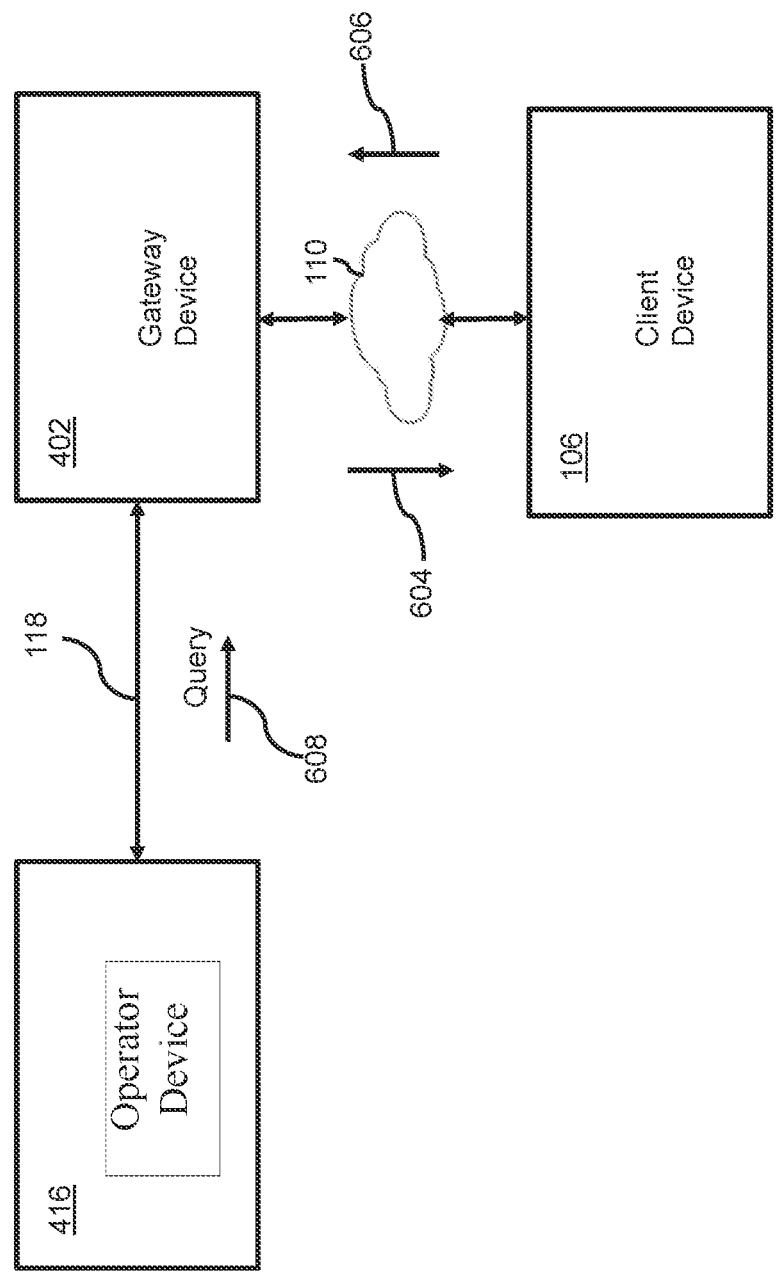

WI-FI MANAGEMENT FRAME RECORDER

BACKGROUND

Embodiments of the invention relate to performing diagnostics on a gateway device.

SUMMARY

Aspects of the present invention are drawn to a gateway device for use with an operator device and a client device for monitoring information associated with the client device. The operator device being in communication with the gateway device via an external network and further being configured to transmit monitoring instructions and information retrieval instructions. The instructions may be based on the use of management information base (MIB) structures. The gateway device being configured to communicate with the client device via a local area network. The gateway device further being configured to include a memory and a processor, wherein the processor is configured to execute instructions stored in the memory to cause the gateway device to: communicate with the operator device via the external network and to communicate with the client device via the local area network; receive the monitoring instructions and information retrieval instructions; and set a medium access control (MAC) address associated with the client device based on the monitoring instructions. The processor further configured to cause the gateway device to: monitor non-data frames of the client device based on the MAC address and the monitoring instructions; store the monitored non-data frames as recorded non-data frames in the memory; and transmit the recorded non-data frames to the operator device based on the information retrieval instructions.

In some embodiments, the memory is further configured to store a predetermined number of the recorded non-data frames. In some of these embodiments, the memory may still be further configured to store the predetermined number of the recorded non-data frames in a first-in, first-out routine.

In some embodiments, wherein the processor is configured to execute instructions stored in the memory to cause the gateway device to: prevent a predetermined type of the monitored non-data frames from being stored as a portion of the recorded non-data frames. In some of these embodiments, the preventing of a predetermined type of the monitored non-data frames from being stored as a portion of the recorded non-data frames includes preventing beacon frames from being stored as the portion of the recorded non-data frames.

In some embodiments, the processor is further configured to execute instructions stored in the memory to cause the gateway device to monitor at least one of the group consisting of management frames, control frames and combinations thereof.

In some embodiments, the processor is further configured to execute instructions stored in the memory to cause the gateway device to provide a graphic user interface (GUI) to enable a user to exclude a type of management frame from as recorded non-data frames.

In some embodiments, the processor is further configured to execute instructions stored in the memory to cause the gateway device to provide a GUI to enable a user to exclude a type of management frame from as recorded non-data frames.

Other aspects of the present invention are drawn to a method of operating a gateway device to enable monitoring a client device from an operator device via the gateway device, the operator device being in communication with the gateway device via an external network and being configured to transmit monitoring instructions and information retrieval instructions. The instructions may be based on the use of management information base (MIB) structures, the client device being in communication with the gateway device via a local area network. The method includes: receiving, via a processor configured to execute instructions stored in a memory, the monitoring instructions; setting, via the processor, a MAC address associated with the client device; monitoring, via the processor, non-data frames of the client device based on the MAC address and the monitoring instructions; storing, into the memory, the monitored non-data frames as recorded non-data frames; receiving, via the processor, information retrieval instructions; and transmitting, via the processor, the recorded non-data frames to the operator device based on the information retrieval instructions.

In some embodiments, the storing of the monitored non-data frames as recorded non-data frames includes storing a predetermined number of the recorded non-data frames. In some of these embodiments, the storing of a predetermined number of the recorded non-data frames includes storing the predetermined number of the recorded non-data frames in a first-in, first-out routine.

In some embodiments, the method further includes preventing, via the processor, a predetermined type of the monitored non-data frames from being stored as a portion of the recorded non-data frames. In some embodiments, the monitoring of non-data frames of the client device includes monitoring at least one of the group consisting of management frames, control frames and combinations thereof.

In some embodiments, the method further includes providing, via the processor, a GUI to enable a user to exclude a type of management frame from as recorded non-data frames.

Other aspects of the present invention are drawn to a non-transitory, computer-readable media having computer-readable instructions stored thereon, the computer-readable instructions being capable of being read by gateway device for use with a wireless client device and an operator device and being configured to communicate with an external network, the operator device being in communication with the gateway device via the external network and being configured to transmit monitoring instructions and information retrieval instructions. The instructions may be based on the use of management information base (MIB) structures, the client device being in communication with the gateway device via a local area network, wherein the computer-readable instructions are capable of instructing the gateway to perform the method: receiving, via a processor configured to execute instructions stored on a memory, the monitoring instructions; setting, via the processor, a MAC address associated with the client device; monitoring, via the processor, non-data frames of the client device based on the MAC address and the monitoring instructions; storing, into the memory, the monitored non-data frames as recorded non-data frames; receiving, via the processor, information retrieval instructions; and transmitting, via the processor, the recorded non-data frames to the operator device based on the information retrieval instructions.

In some embodiments, the computer-readable instructions are capable of instructing the gateway to perform the method wherein the storing the monitored non-data frames as recorded non-data frames includes storing a predetermined number of the recorded non-data frames. In some of these embodiments, the computer-readable instructions are capable of instructing the gateway to perform the method wherein the storing a predetermined number of the recorded non-data frames includes storing the predetermined number of the recorded non-data frames in a first-in, first-out routine.

In some embodiments, the computer-readable instructions are capable of instructing the gateway to perform the method further includes preventing, via the processor, a predetermined type of the monitored non-data frames from being stored as a portion of the recorded non-data frames.

In some embodiments, the computer-readable instructions are capable of instructing the gateway to perform the method wherein the monitoring non-data frames of the client device includes monitoring at least one of the group consisting of management frames, control frames and combinations thereof.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 6C illustrates an exploded view of the gateway device, client device, and operator device of FIG. 4 at a time $t_3$.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
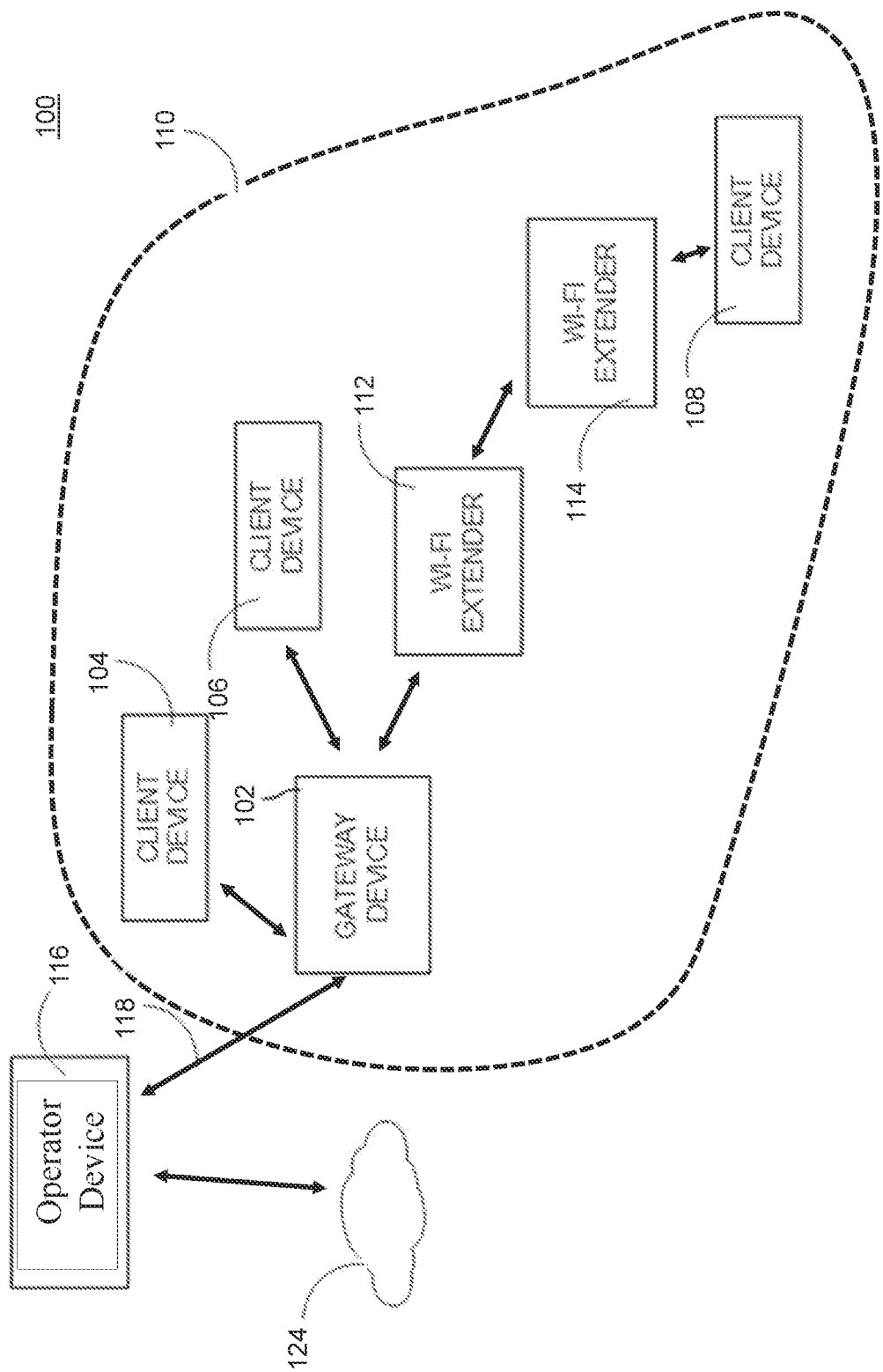
FIG. 1 illustrates structural components implementing an electronic communication network.

FIG. 1 illustrates structural components implementing an electronic communication network 100, which includes: a gateway device 102; a plurality of client devices, a sample of which are illustrated as a client device 104, a client device 106 and a client device 108; a plurality of Wi-Fi extenders, a sample of which are illustrated as a Wi-Fi extender 112 and a Wi-Fi extender 114; an operator device 116 and an external network 124, e.g., the Internet.

A gateway device 102, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 102 may be any device or system that is configured to allow data to flow from one discrete network to another. Gateway device 102 may perform such functions as inroute bandwidth allocation and load balancing, outroute prioritization, web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 102 establishes, or is part of, WLAN 110, using Wi-Fi for example, such that client devices 104, 106, 108, and Wi-Fi extenders 112 and 114 are able to communicate wirelessly with gateway device 102. In particular, gateway device 102 is able to communicate wirelessly directly with client devices 104, 106, and 108 and Wi-Fi extender 112. Further, gateway device 102 is able to communicate wirelessly with Wi-Fi extender 114 via Wi-Fi extender 112 and is able to communicate wirelessly with client device 108 via Wi-Fi extender 112 and Wi-Fi extender 114. The term Wi-Fi as used herein may be considered to refer to any of Wi-Fi 4, 5, 6, 6E, or any variation thereof.

Further, it should be noted that gateway device 102 is able to communicate with operator device 116 via communication connection 118 which may be physical media/wiring or a wireless communication system, such as 4G, or 5G, and further is able to connect to external network 124, e.g., the Internet, via operator device 116.

Operator device 116 includes head-end equipment such as server computers (e.g., automatic configuration server ACS, cable modem termination system CMTS) that enable an operator device, such as a cable television provider, a satellite television provider, an internet operator device, or multiple-systems operator (MSO), to provide service (such as internet service) either through physical media/wiring, such as a coaxial network, an optical fiber network, and/or DSL, or external network 124, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a DOCSIS network, a fiber optics network (e.g, FTTH (fiber to the home), FTTX (fiber to the X), or hybrid fiber-coaxial (HFC)), a digital subscriber line (DSL), a public switched data network (PSDN), a global Telex network, or a 2G, 3G, 4G or 5G network, for example.

Gateway device 102 serves as a gateway or access point to external network 124, e.g., the Internet (or otherwise as mentioned above), for one or more electronic devices, referred to generally herein as client devices 104, 106, 108 that wirelessly communicate with gateway device 102 via, e.g., Wi-Fi. Client devices 104, 106, 108 can be desk top computers, laptop computers, electronic tablet devices, smart phones, appliances, or any other so-called internet of things equipped devices that are equipped to communicate information via WLAN 110.

Wi-Fi extenders 112 and 114 can be paired with gateway device 102 in order to communicate wirelessly with gateway device 102 and extend the coverage area of WLAN 110. Any of the client devices 104, 106, and 108 can be in communication with gateway device 102 or any of Wi-Fi extenders 112 and 114.

Gateway device 102 has the capability of wirelessly communicating with plural electronic user devices over respective communication avenues. In order to extend the area in which WLAN 110 is effective, beyond the radio reach of gateway device 102, one or more of Wi-Fi extenders 112 and 114 can be added. The establishment of the operative communications between a Wi-Fi extender 112 and gateway device 102 (or between Wi-Fi extender 114 and an already established Wi-Fi extender 112) is referred to as onboarding the extender. Once onboarded, the Wi-Fi extenders 112 and 114 can communicate wirelessly with gateway device 102. However, rather than using one of the communication avenues that are allocated for communication with user devices, a dedicated avenue of communication may be established, at least at some times, between the extender and gateway device 102. This dedicated avenue is referred to as a backhaul.

Within WLAN 110, electronic devices are often referred to as being stations in WLAN 110. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

A wireless access point (WAP), or more generally just access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In WLAN 110, gateway device 102, Wi-Fi extender 112 and Wi-Fi extender 114 are access points for WLAN 110.

Each of client devices 104, 106, and 108 are configured to communicate information via WLAN 110 in addition to utilizing network hardware, such as a wireless access point ("WAP" or "AP"), small cells, femtocells, or cellular towers. It is to be understood that client devices 104, 106 and 108 are configured to gain convenient high-speed access to networks, such as WLAN 110, via one or more access points that are associated with one or more operator device 116.

Operator device 116 is configured to transmit one or more requests to gateway device 102 in order to assist operator device 116 with monitoring, policing, and troubleshooting issues associated with gateway device 102 or client devices 104, 106 and 108 and/or issues associated with providing services to client devices 104, 106 and 108. Troubleshooting includes, but is not limited to, operator device 116 sending instructions to gateway device 102 to perform session packet capture and analysis associated with client devices 104, 106 and 108, and segmentation of network and premises equipment of system 100 in order to isolate faults.

In addition to serving as access points for WLAN 110, Wi-Fi extenders 112 and 114 are further configured to expand the coverage of one or more wireless signals associated with client devices 104, 106 and 108 by capturing the Wi-Fi from one or more routers providing wireless signals to client devices 104, 106 and 108, and rebroadcasting the wireless signals to areas where the Wi-Fi is weak or nonexistent. Wi-Fi extenders 112 and 114 are further configured to support multi-user, multiple input, multiple output (MU-MIMO) in order to support environments where multiple users are attempting access the same wireless network at the same time.

Figure 2:
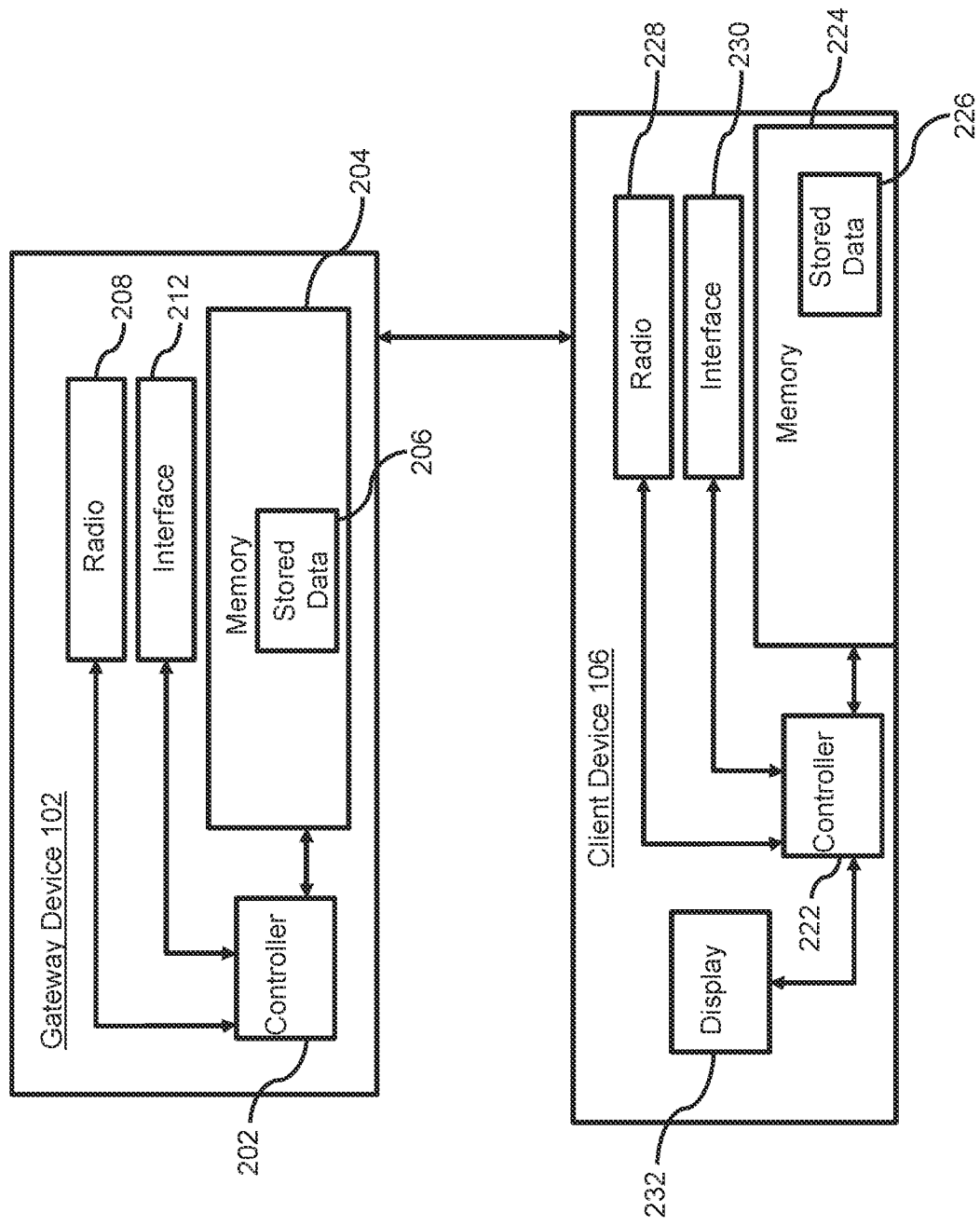
FIG. 2 illustrates an exploded view of the gateway device and client device of FIG. 1.

FIG. 2 illustrates an exploded view of gateway device 102 and client device 106 of FIG. 1.

As shown in FIG. 2, gateway device 102 includes: a controller 202; a memory 204, which has controller executable instructions stored therein; at least one radio, a sample of which is illustrated as a radio 208; and an interface circuit 212.

Controller 202 can include a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 102 in accordance with the embodiments described in the present disclosure. Memory 204 can store various programming, and user content, and data as stored data 206. Interface circuit 212 can include one or more connectors, such as RF connectors, or Ethernet connectors, and/or wireless communication circuitry, such as 5G circuitry and one or more antennas. Interface circuit 212 receives service from operator device 116 (as shown in FIG. 1) by known methods, non-limiting examples of which include terrestrial antenna, satellite dish, wired cable, DSL, optical fibers, or 5G as discussed above. Through interface circuit 210, gateway device 102 receives an input signal, including data content, from operator device 116 and can send data to operator device 116.

Radio 208, (and preferably two or more radios), may also be referred to as a wireless communication circuit, such as a Wi-Fi WLAN interface radio transceiver and is configured to communicate with client devices 104, 106 and 108, and with Wi-Fi extenders 112 and 114. Radio 208 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Gateway device 102 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

In this example, controller 202, memory 204 and radio 208 are illustrated as individual devices. However, in some embodiments, at least two of controller 202, memory 204 and radio 208 may be combined as a unitary device. Further, in some embodiments, at least one of controller 202 and memory 204 may be implemented as a computer having tangible computer-readable media for carrying or having computer-executable instructions or data structures stored thereon.

Client device 106 includes: a controller 222; a memory 224, which includes controller executable instructions stored therein; and at least one radio, a sample of which is illustrated as a radio 228; an interface circuit 230 and a display 232

Controller 222, can include a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the client device 106 in accordance with the embodiments described in the present disclosure. Memory 224 can store various programming, and user content, and data as stored data 226. Radio 228, such as a Wi-Fi WLAN interface radio transceiver, is configured to communicate with gateway device 102, as shown in FIG. 1. Radio 228 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 106 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

In this example, controller 222, memory 224, radio 228, interface circuit 230 and display 232 are illustrated as individual devices. However, in some embodiments, at least two of controller 222, memory 224, radio 228, interface circuit 230 and display 232 may be combined as a unitary device. Further, in some embodiments, at least one of controller 222 and memory 224 may be implemented as a computer having tangible computer-readable media for carrying or having computer-executable instructions or data structures stored thereon.

Any of the client devices within network 100 may be a mobile device. In the event that a client device within WLAN 110 is not a mobile device, such a client device may still include: a controller, which can include a dedicated control circuit, CPU, microprocessor, etc., and that controls the circuits of the client device; a memory, which has stored therein controller executable instructions, that is similar to memory 224, of client device 106 discussed above; a radio similar to radio 228 of client device 106 discussed above; in additional to further functional circuitry. Accordingly, any of the client devices may include a Wi-Fi WLAN interface radio transceiver that is configured to communicate with other client devices, with Wi-Fi extenders 112 and 114 and with gateway device 102, as shown in FIG. 1. Further, any of the client devices may include a radio that is similar to radios 208 and 228 discussed above. Still further, any of the client devices may be equipped with a radio to implement a Bluetooth interface radio transceiver and antenna, or with a radio meeting RF4CE protocol, Zigbee protocol, and/or IEEE 802.15.4 protocol, which also communicates in the ISM band, in a manner similar to discussed above.

Insofar as gateway device 102 provides connection to operator device 116, gateway device 102 can be equipped with connectors to connect with a television or display device, and can also include programming to execute an electronic program guide and/or other suitable GUI, and can with such configuration be referred to as a so called set top box. Such a set top box can be included in the system shown in FIG. 1 as gateway device 102 or in addition thereto. Moreover, inclusion of one or more of far-field microphones, (for example, voice command and/or presence recognition, and/or telephone communication), cameras, (for example, gesture and/or presence recognition, and/or video telephone communication), and speakers, and associated programming, can enable the gateway device to be a so-called smart media device.

The processes disclosed herein constitute algorithms that can be effected by software, applications (apps, or mobile apps), or computer programs. The software, applications, and computer programs can be stored in a non-transitory computer-readable medium for causing a computer, such as the one or more processors, to execute the processes.

A plurality of issues commonly associated with connectivity between client devices are usually associated with an inability for an operator device to consistently communicate with the client devices within a local area network. This is described in more detail with reference to FIG. 3.

Figure 3:
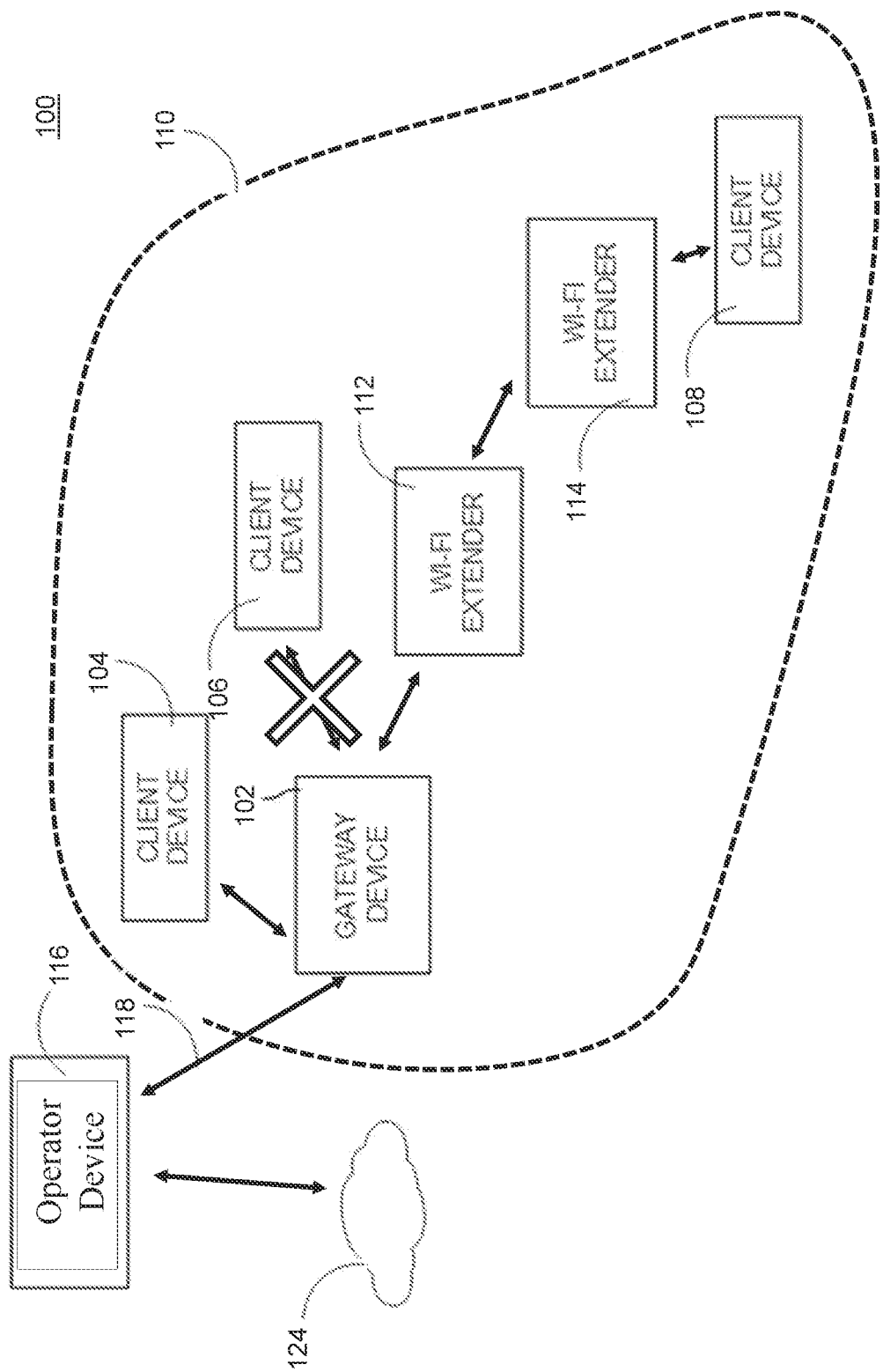
FIG. 3 illustrates the communication system of FIG. 1 in an instance wherein a client device has trouble connecting to the gateway device.

FIG. 3 illustrates communication system 100 in an instance wherein client device 106 has trouble connecting to gateway device 102. Such problems may manifest as client device 106 not connecting at all to gateway device 102 or client device 106 repeatedly being unintentionally disconnected/reconnected from gateway device 102. Most times, a typical user may not know why client device 106 is having problems connecting to gateway device 102. In such cases, the typical user may contact the service provider, operating operator device 116, to complain and ask for assistance.

Conventionally, in order to rectify these connectivity issues, the service provider associated with operator device 116 must send a technician to physically (in-person) troubleshoot the local area network by capturing wireless packets sent over the air in order to determine the root of the connectivity issues.

What is needed is a system and method for remotely monitoring and rectifying connectivity issues within a local area network between a client device and operator device via a gateway device.

A system and method in accordance with the present disclosure remotely monitors and rectifies connectivity issues within a local area network between a client device and operator device via a gateway device. Aspects of the present disclosure are drawn to remotely monitoring and rectifying connectivity issues within a local area network by circumventing the requirement of the technician physically troubleshooting the local area network by providing a gateway device communicatively coupled to the operator device configured to receive monitoring instructions and information retrieval instructions from the operator device. The gateway device is configured to processes the monitoring and retrieval instructions in order to monitor non-data frames associated with the client device at issue, to store monitored non-data frames, and to transmit the monitored non-data frames to the operator device.

An example system and method for remotely monitoring and rectifying connectivity issues within a local area network in accordance with aspects of the present disclosure will now be described in greater detail with reference to FIGS. 4-8.

Figure 4:
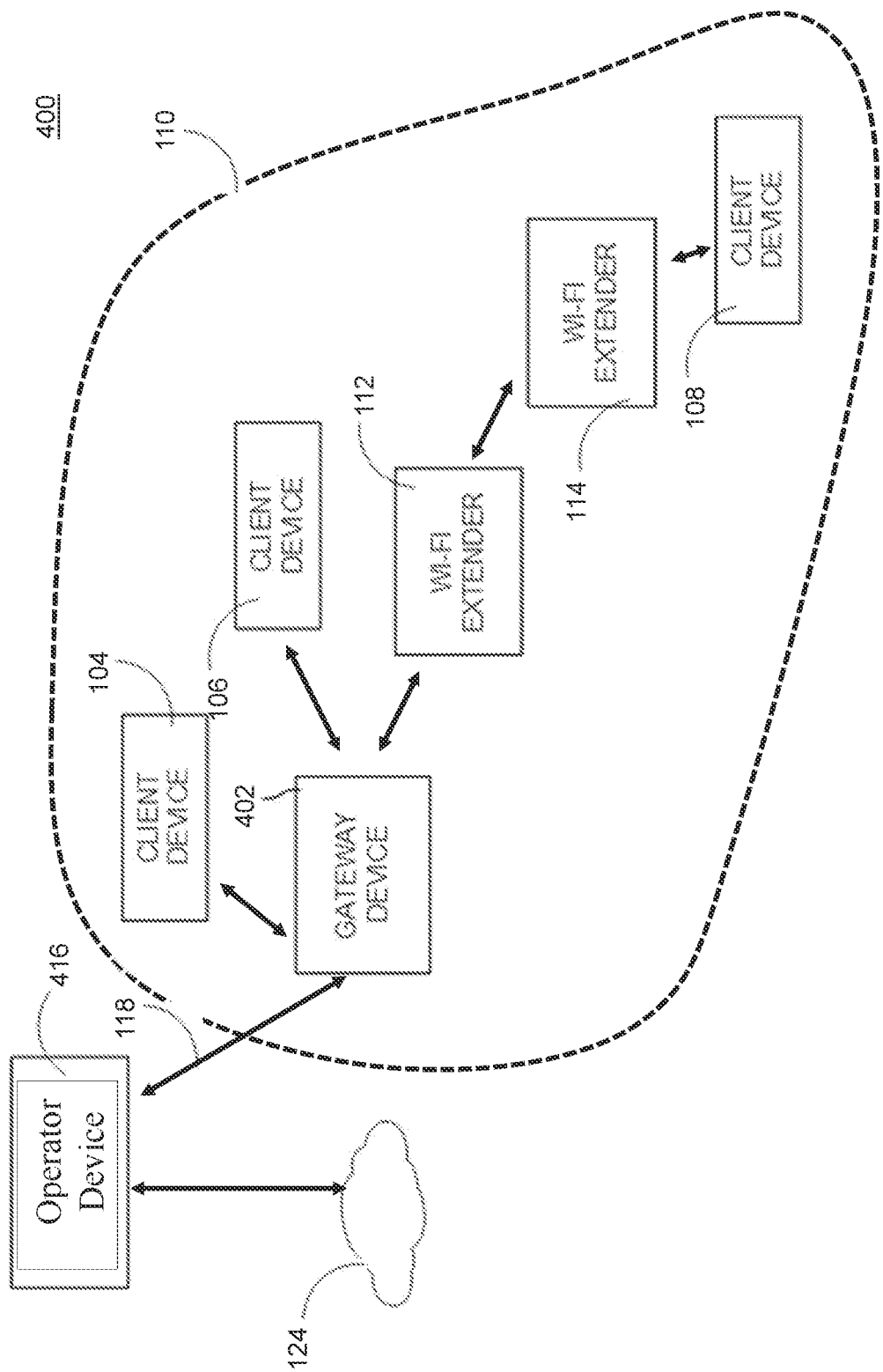
FIG. 4 illustrates a communication system in accordance with aspects of the present disclosure.

FIG. 4 illustrates a communication system 400 in accordance with aspects of the present disclosure.

As shown in the figure, system 400 includes a gateway device 402, client device 104, client device 106, client device 108, Wi-Fi extender 112, Wi-Fi extender 114, operator device 416, each of the aforementioned components configured to be communicatively associated via WLAN 110.

As shown in FIG. 4, gateway device 402 is arranged to communicate with client devices 104, 106, 108 and with Wi-Fi extender 412 over WLAN 110. Further, gateway device 402 is arranged to communicate with operator device 416, wherein the communication may be accomplished via communication connection 118 which may be physical media/wiring or a wireless communication system, such as 4G, or 5G.

Gateway device 402 is configured to function similarly to gateway device 102 of FIG. 1 in which gateway device 402 assists operator device 416 in providing one or more internet connections to a premises in a manner in which the one or more internet connections are converted into one or more Wi-Fi signals to which client devices 104, 106, and 108 may connect. It is to be understood that operator device 416 may be one or more servers, a provider network, internet service provider (ISP), application service providers, content provider, or any other computer.

Operator device 416 is configured to transmit requests to detect and/or monitor connectivity issues associated with gateway device 402 and client devices 104, 106, and 108 within WLAN 110, and provide monitoring instructions to gateway device 402 based on one or more network protocols, such as SNMP management information base (MIB) structures or TR-069 and TR-181 database structures. In some embodiments, a MIB structure may include settings to configure a device to monitor and transmit MAC frames, such as, but not limited to, management frames, control frames, data frames, beacon frames, probe frames, subframes of the aforementioned, any combinations thereof, or any other applicable frames. Operator device 416 is further configured to utilize the MIB structure to communicate a MAC address of the applicable client device in order to specify to gateway device 402 which of client devices 104, 106, and 108 should be monitored resulting in gateway device 402 performing recording and storage of non-data frames associated with one of client devices 104, 106, and 108. Operator device 416 is further configured to utilize the MIB structure to initiate subsequent transmission of stored non-data frames to operator device 416 based one or more monitoring instructions previously transmitted from operator device 416 to gateway device 402. Though this operation is described in terms of SNMP MIBs, other protocols and communication systems could be used, such as TR-069/TR-181 or YANG.

System 400 of FIG. 4 operates differently from system 100 discussed above in reference to FIG. 1. In particular, system 400 operates in accordance with aspects of the present invention, which will now be discussed in greater detail with reference to FIGS. 5-8.

For purpose of discussion, consider a situation wherein operator device 416 needs to determine whether gateway device 402 is operating correctly with respect to being connected to one or more of client devices 104, 106, and 108. Operator device 416 is configured to remotely monitor and troubleshoot the connectivity between gateway device 402 and client devices 104, 106, and 108 without requiring a technician to be physically sent to the premises associated with WLAN 110 to perform troubleshooting.

Figure 5:
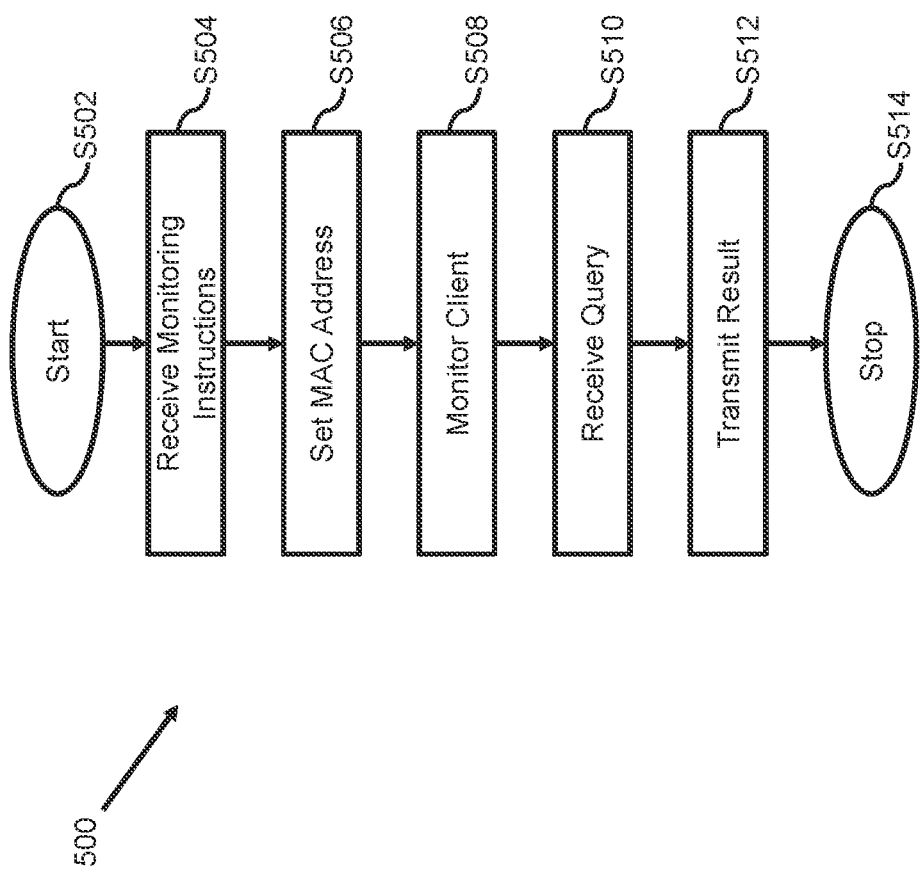
FIG. 5 illustrates an example method of operating the gateway device to enable recording of monitoring frames of a client device and transmission of monitoring frames to an operator device.

FIG. 5 illustrates an example method 500 of operating a gateway device to enable recording of monitoring frames of a client device and transmission of monitoring frames to an operator device.

As shown in FIG. 5, method 500 starts (S502), and monitoring instructions are received (S504). This will be discussed in greater detail with reference to FIG. 6A.

Figure 6A:
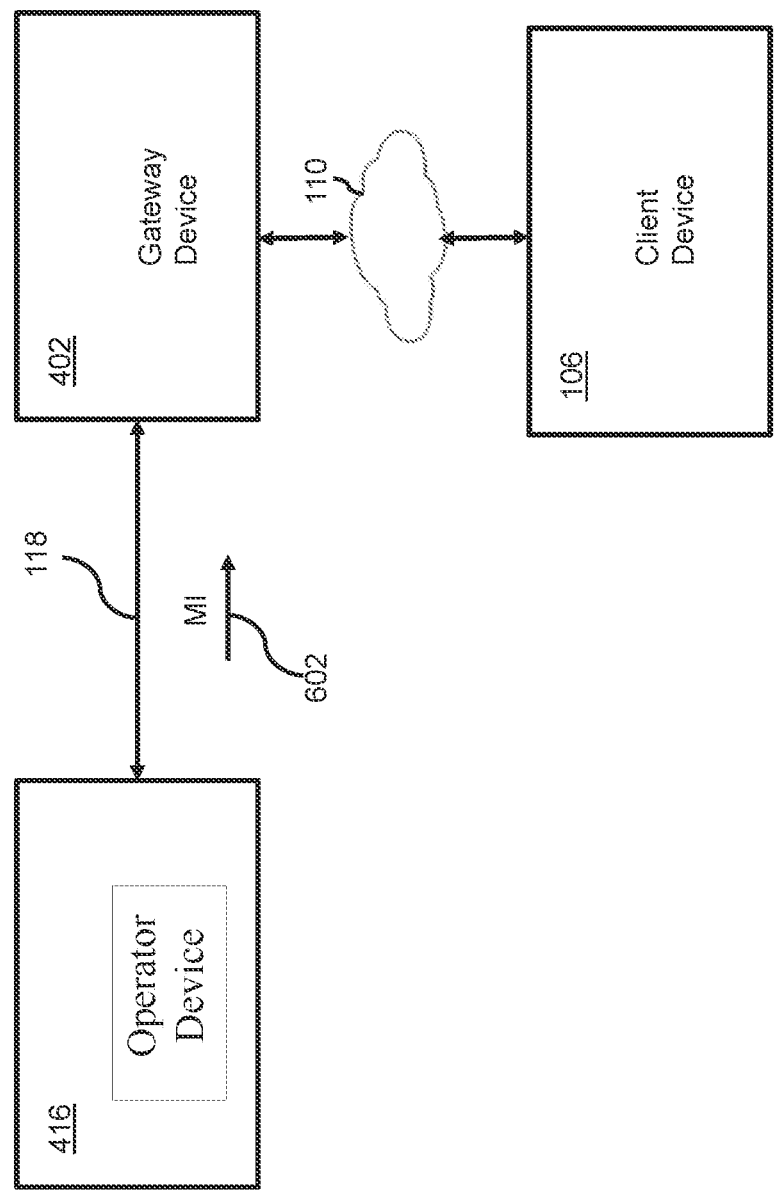
FIG. 6A illustrates an exploded view of the gateway device, client device, and operator device of FIG. 4 at a time $t_1$.

FIG. 6A illustrates an exploded view of gateway device 402, client device 106, and operator device 416 at a time $t_1$.

As shown in FIG. 6A, gateway device 402 is arranged to communicate with client device 106 over network 110. Further, gateway device 402 is arranged to communicate with operator device 416 over external network 124.

In operation, gateway device 402 receives monitoring instructions 602 from operating device 416. In some embodiments, operator device 416 detects one or more connectivity issues associated with one of client devices 104, 106, and 108 resulting in noncontinuous or delayed access of client device 106 to network 102 based on a configuration wherein gateway device 402 is in communication with operator device 416 via communication connection 118 and client device 106 via WLAN 110. Upon detecting the one or more connectivity issues (either via the operator device side or via reporting of issues from a client device), operator device 416 transmits monitoring instructions 602 based on the MIB. However, at this point, operator device 416 is only aware that there is a connectivity issue associated with a client device in WLAN 110, but does not know which client device is experiencing the one or more connectivity issues.

In some embodiments, gateway device 402 is configured to monitor information associated with the connectivity of client devices 104, 106, and 108 with WLAN 110, non-limiting examples of such information includes date and time connection was initiated, active and idle times, name of internal network computer being connected to, IP address of client, and any other applicable connectivity information associated with WLAN 110.

Operator device 416 may specify monitoring instructions 602 sent to gateway device 402, such as indicating a specific type of data to be monitored, however operator device 416 may use the MIB to identify the MAC address of the client device that needs to be monitored. It is to be understood that monitoring instructions 602 may be transmitted from operator device 416 to gateway device 402 continuously, incrementally, or in any other applicable manner that assists gateway device 402 in actively monitoring non-data frames of client devices within WLAN 110.

This will be described in greater detail with respect to FIG. 7.

Figure 7:
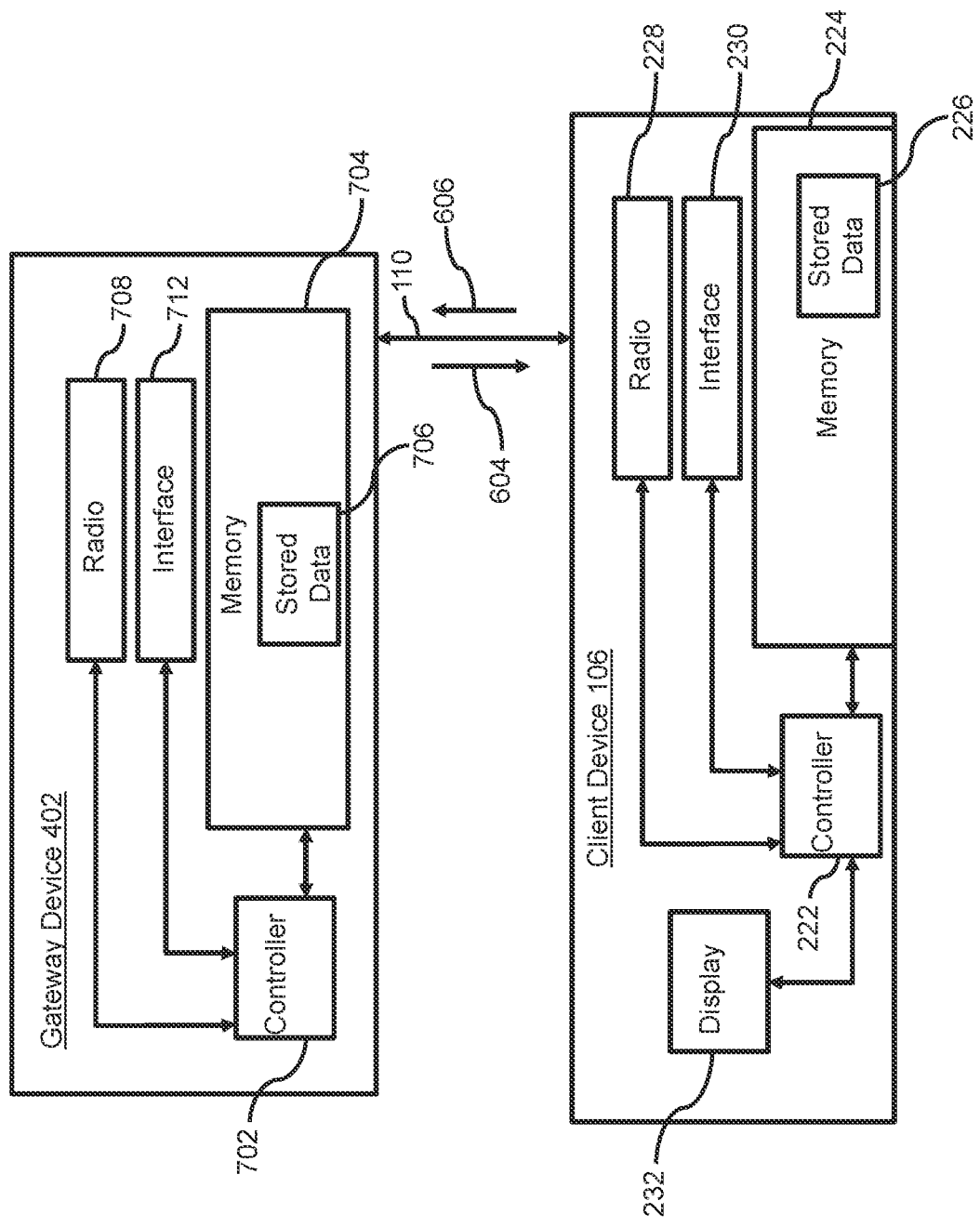
FIG. 7 illustrates an exploded view of the gateway device and client device of FIG. 4.

FIG. 7 illustrates an exploded view of gateway device 402 and client device 106.

As shown in FIG. 7, gateway device 402 includes a controller 702, a memory 704 having controller readable instructions stored therein, a radio 708, and a gateway communication interface circuit 712. Further, client device 106 includes a controller 222, a memory 224 having controller executable instructions 226 stored therein, a radio 228, an interface circuit 230 and a display 232.

In this example, in gateway device 402, controller 702, memory 704, radio 708, and gateway communication interface circuit 712 are illustrated as individual devices. However, in some embodiments, at least two of controller 702, memory 704, radio 708, and gateway communication interface circuit 712 may be combined as a unitary device. Whether as individual devices or as combined devices, controller 702, memory 704, radio 708, and gateway communication interface circuit 712 may be implemented as any combination of an apparatus, a system and an integrated circuit. Further, in some embodiments, at least one of controller 702, memory 704, radio 708, and gateway communication interface circuit 712 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 702 can include a dedicated control circuit, CPU, microprocessor, etc. Controller 702 controls the circuits of gateway device 402. Memory 704 can store various programming, and user content, and data as stored data 706.

As will be described in more detail below, stored data 706 includes instructions that may be used by controller 702 to cause gateway device 402 to communicate with operator device 416 via external network 124, and further cause gateway device 402 to communicate with client device 106 via WLAN 110. In some embodiments, the instructions cause gateway device 402 to receive monitoring instructions and information retrieval instructions from operator device 416. In some embodiments, the instructions cause gateway device 402 to set a MAC address associated with client device 106 based on the monitoring instructions. Memory 704 can further store the monitored non-data frames as recorded non-data frames. Still further, in some embodiments, the instructions cause gateway device 402 to transmit the recorded non-data frames to operator device 416.

In some embodiments, memory 704 is further configured to store a predetermined number of the recorded non-data frames. Further, in some embodiments, memory 704 is still further configured to store the predetermined number of the recorded non-data frames in a first-in, first-out routine. Still further, in some embodiments, the instructions cause gateway device 402 to prevent a predetermined type of the monitored non-data frames from being stored as a portion of the recorded non-data frames.

In some embodiments, the instructions cause gateway device 402 to provide a GUI to enable a user to select or exclude the client device(s) to be monitored.

In some embodiments, the instructions cause gateway device 402 to provide a GUI to enable a user to monitor frames of different types, wherein the types are at least one of the group consisting of management frames, control frames and combinations thereof.

In some embodiments, the instructions cause gateway device 402 to provide a GUI to enable a user to exclude a type of non-data frame from the recorded non-data frames.

Radio 708 (and preferably two or more radios) may also be referred to as a wireless communication circuit, such as a Wi-Fi WLAN interface radio transceiver and is operable to communicate with client devices, such as client device 106. Radio 708 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 106 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Gateway communication interface circuit 712 can include one or more connectors, such as RF connectors, or Ethernet connectors, and/or wireless communication circuitry, such as 5G circuitry and one or more antennas. Gateway communication interface circuit 712 receives service from operator device 416 by known methods, non-limiting examples of which include terrestrial antenna, satellite dish, wired cable, DSL, optical fibers, or 5G as discussed above. Through gateway communication interface circuit 712, gateway device 402 receives an input signal, including data and/or audio/video content, from the operator device 416 and can send data to the operator device 416.

Controller 702 receives monitoring instructions 602 from operator device 416. This will be described in greater detail with respect to FIG. 8.

Figure 8:
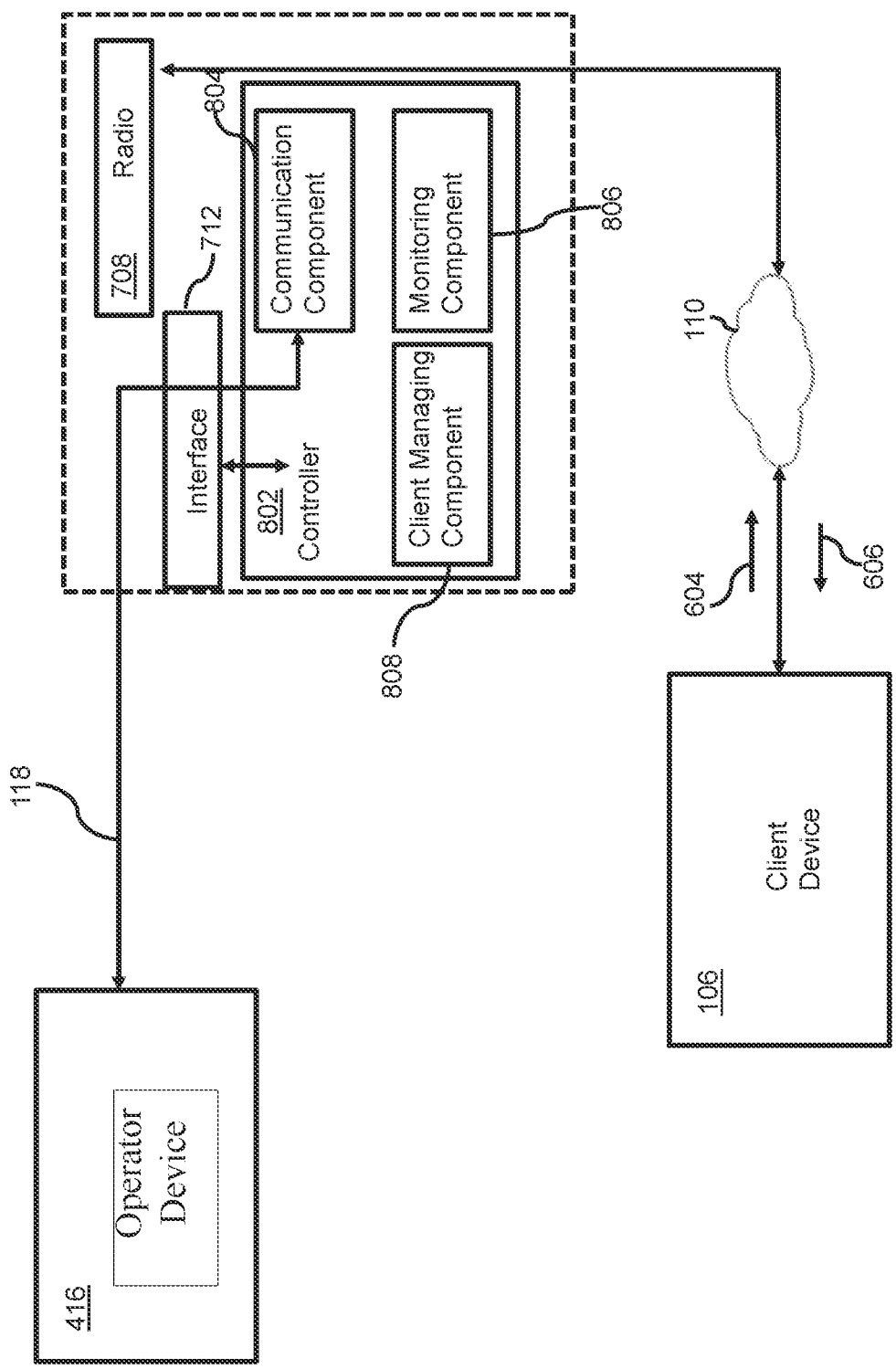
FIG. 8 illustrates an exploded view of a portion of the gateway device and client device of FIG. 4.

FIG. 8 illustrates an exploded view of a portion of gateway device 402 including controller 802, gateway communication interface circuit 712, and radio 708.

As shown in FIG. 8, controller 802 includes a communication component 804, a monitoring component 806, and a client managing component 808.

In this example, communication component 804, monitoring component 806, and client managing component 808 are illustrated as individual devices. However, in some embodiments, at least two of communication component 804, monitoring component 806, and client managing component 808 may be combined as a unitary device. Whether as individual devices or as combined devices, communication component 804, monitoring component 806, and client managing component 808 may be implemented as any combination of an apparatus, a system and an integrated circuit. Further, in some embodiments, at least one of communication component 804, monitoring component 806, and client managing component 808 may be implemented as a computer having non-transitory computer-readable media for carrying or having computer-executable instructions or data structures stored thereon.

Controller 802 is arranged to communicate with operator device 416 via communication connection 118 by way of gateway communication interface circuit 712. Gateway communication interface circuit 712 may be additionally arranged to enable radio 708 to communicate with client device 106 over WLAN 110.

Communication component 804 enables controller 802 to communicate with operator device 416 using the protocols such as DOCSIS. WLAN 110 has communication protocols that are different from the protocols associated with external network 124. Radio 708 enables controller 802 to communicate with client device 106 using the protocols associated with WLAN 110. Gateway communication interface circuitry 712 enables controller to map communications from client device 106 having network communication protocols associated with WLAN 110, e.g., Wi-Fi, to communications to operator device 416 having network communication protocols associated with the operator device 416, e.g., DOCSIS, and vice versa.

Returning to FIG. 5, after monitoring instructions 602 are received (S504), a MAC address is set (S506). For example, once monitoring instructions 602 are received, gateway device 402 utilizes TCP/UDP packets in addition to the assistance of the MIB in order to determine the MAC address associated with client device 106. In some embodiments, setting of the MAC address may be accomplished on the user side via the MIB thus, circumventing the need to have a technician associated with operator device 416 to physically come and perform troubleshooting on the premises associated with WLAN 110. One or more filtering mechanisms may be used by gateway device 402 in order to extract information of particular interest, such as the MAC address of client device 106. It should be noted that in some embodiments, a GUI may be included in gateway device 402 (not shown) to enable a technician to perform troubleshooting on the premises associated with WLAN 110. In these GUI-enabled embodiments the technician may instruct gateway device 402 to monitor and store non-data frames of client device 106. In particular, in these GUI-enabled embodiments, the technician may instruct gateway device 402 to exclude a type of management frame from being recorded as recorded non-data frames Further, in these GUI-enabled embodiments, the technician may instruct gateway device 402 to only include management frames, control frames and combinations thereof.

Returning to FIG. 5, after the MAC address has been set (S506), non-data frames of client device are monitored (S508). This will be described in greater detail with reference to FIG. 6B.

Figure 6B:
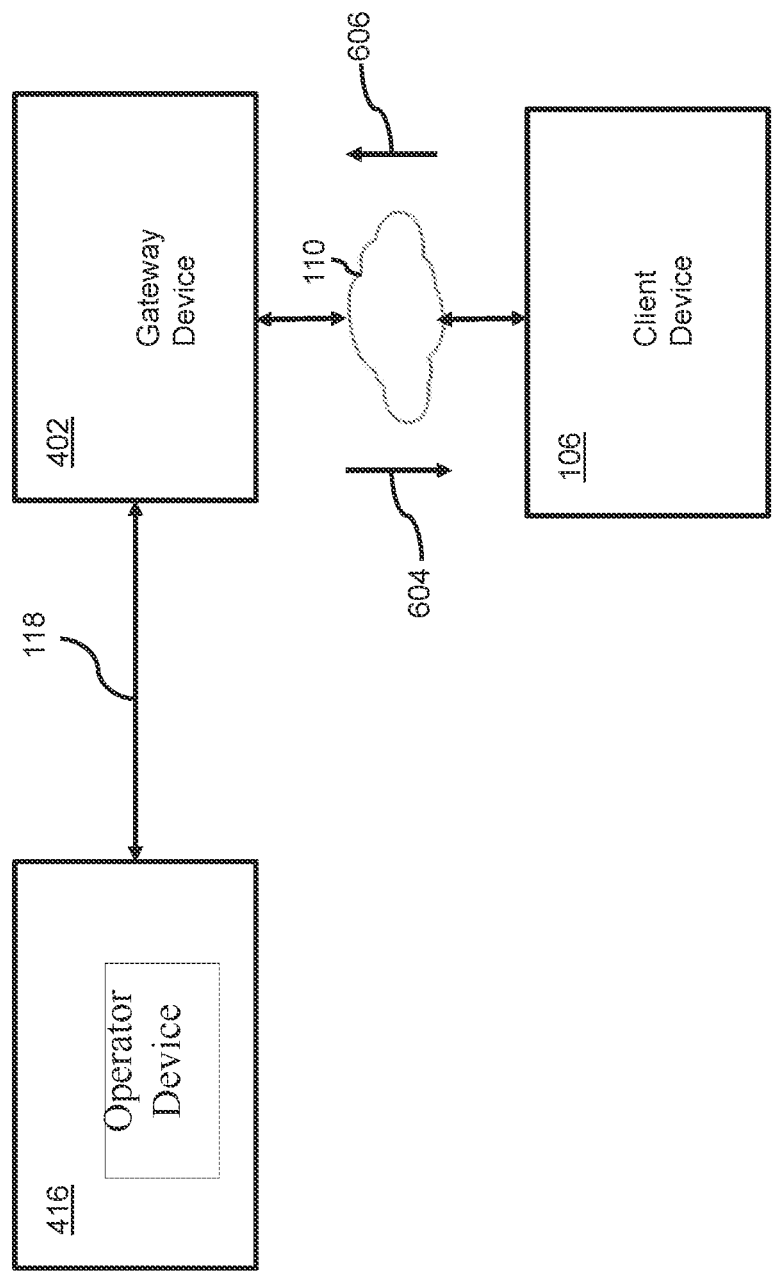
FIG. 6B illustrates an exploded view of the gateway device, client device, and operator device of FIG. 4 at a time $t_2$.

FIG. 6B illustrates the exploded view of gateway device 402, client device 106, and operator device 416 of FIG. 6A at a time $t_2$, wherein gateway device 402 monitors frames 604 to client device 106 and frames 606 from client device 106.

In operation, client device 106 is continuously attempting to connect to WLAN 110 to receive one or more services associated with operator device 416. Due to the MAC address being set, gateway device 402 is continuously monitoring frames 604 transmitted to client device 106 and frames 606 received from client device 106, and filters the monitored non-data frames based on a predetermined criteria. In other words, gateway device 402 is configured to prevent a predetermined type of monitored non-data frame from being stored as a portion of the recorded non-data frames. For example, gateway device 402 may filter non-data frames 604 and 606 based on the classification of the non-data frame, wherein the predetermined criteria requires gateway device 402 to filter out control frames and store management frames due to the storage of management frames requiring significantly less memory space than control frames.

In some embodiments, gateway device 402 specifically monitors and records non-data frames based on the MAC address and monitoring instructions 602 in order to control the amount of memory 704 being used to store the recorded non-data frames. It is to be understood that gateway device 402 may store only the non-data frames because other frames, such as data frames, may be too ample in size and/or amount to be compiled and sent to operator device 416.

For purposes of discussion, let operator device 416 have knowledge that client device 106 is a client device experiencing one or more connectivity issues. With this knowledge the MAC address of client device 106 communicated to gateway device 402. In embodiments, operator device 416 may use an SNMP MIB to provide the MAC address to the gateway. Using the MAC address provided by operator device 416, gateway device 402 monitors frames 604 transmitted to client device 106 and frames 606 transmitted from client device 106. It is to be understood that frames 604 and frames 606 are configured to be used by wireless clients to initiate and tear down sessions for network services; however, non-data frames of frames 604 and non-data frames of frames 606 are not ordinarily encrypted due to the inherent nature of the frames being configured to be heard and understood by all client devices in a network in addition to being transmitted in an open/unencrypted manner.

Returning to FIG. 8, radio 708 transmits frames 604 to client device 106 via WLAN 110 and further provides copies of frames 604 to monitoring component 806. Client managing component 808 instructs monitoring component 806 as to which frames are to be recorded based on monitoring instructions 602 in the MIB as received from operator device 416.

In some embodiments, client managing component 808 instructs monitoring component 806 that the frames to be recorded are non-data frames, which include management frames, control frames, and combinations thereof.

Returning to FIG. 8, radio 708 receives frames 606 from client device 106 via WLAN 110 and further provides copies of frames 606 to monitoring component 806. Again, client managing component 808 instructs monitoring component 806 as to which frames are to be recorded based on monitoring instructions 602 in the MIB as received from operator device 416.

Returning to FIG. 7, in some embodiments, gateway device 402 is further configured to store a predetermined number of the recorded non-data frames into memory 704 as stored data 706. For example, gateway device 402 may record the first 100 non-data frames of frames 604 and 606 depending on whether the 100 frames are sufficient for operating device 416 to identify and rectify connectivity issues associated with client device 106. In some embodiments, memory 704 of gateway device 402 is configured to store the predetermined number of recorded non-data frames in a first-in, first-out (FIFO) routine.

Returning to FIG. 5, after non-data frames of client device are monitored (S508), information retrieval instructions are received (S510). Gateway device 402 stores the recorded non-data frames as stored data 706 in order to subsequently send the recorded non-data frames to operator device 416 based on information retrieval instructions received from operator device 416. This will be described in greater detail with respect to FIG. 6C.

FIG. 6C illustrates the exploded view of gateway device 402, client device 106, and operator device 416 of FIG. 6A at a time $t_3$.

As shown in FIG. 6C, operator device 416 transmits information retrieval instructions 608 to gateway device 406 via external network 124. Returning to FIG. 8, operator device 416 transmits information retrieval instructions 608 to gateway device 402 used as a MIB structure. It is to be understood that other mechanisms that allow for sending queries according to various protocols may be accounted for in transmitting information retrieval instructions 608 to gateway device 402. Communication component 804 receives information retrieval instructions 608 from operator device 416 and provides the received information retrieval instructions 608 to client managing component 808.

Returning to FIG. 5, after information retrieval instructions are received (S510), the results of the information retrieval instructions are transmitted (S512). For example, gateway device 402 transmits the results of the information retrieval instructions to operator device 416 via external network 124.

Figure 6D:
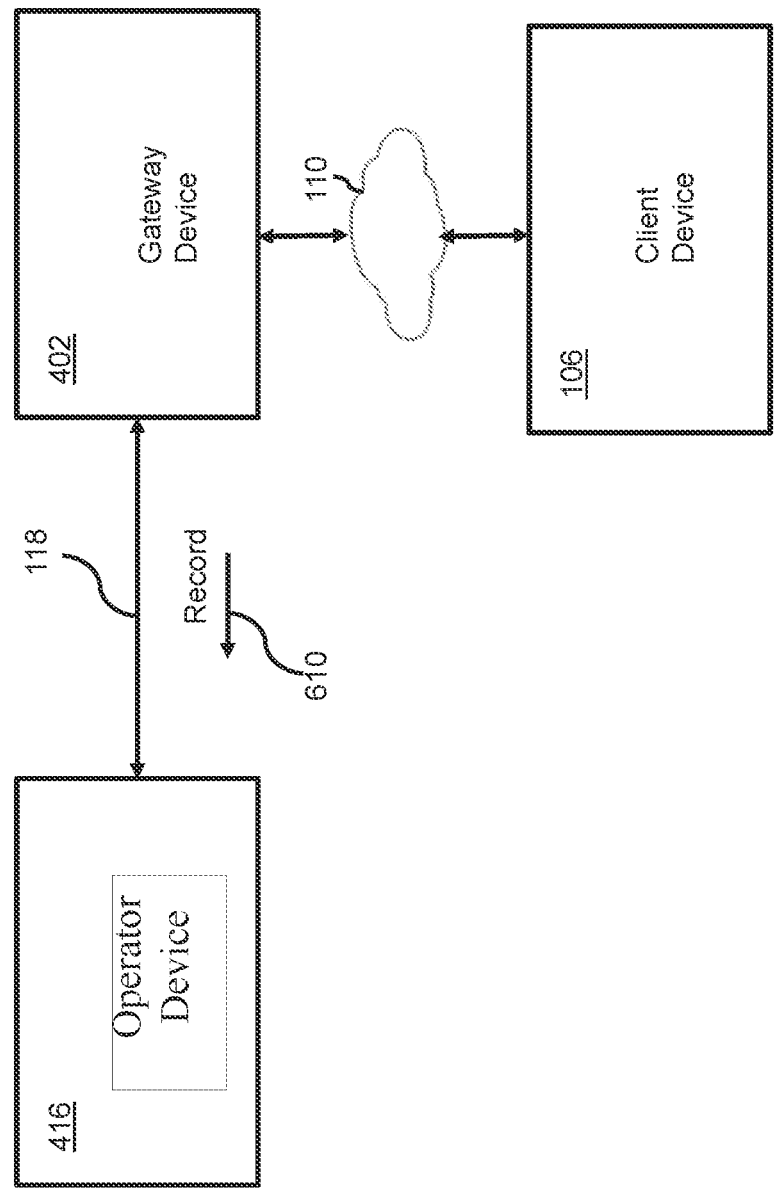
FIG. 6D illustrates an exploded view of the gateway device, client device, and operator device of FIG. 4 at a time $t_4$.

FIG. 6D illustrates the exploded view of gateway device 402, client device 106, and operator device 416 at a time $t_4$. As shown in the figure, gateway device 402 transmits a record 610, which includes the results of information retrieval instructions 608 to operator device 416 via external network 124.

As shown in the figure, the recorded management frames are accessed and compiled into record 610 configured to be transmitted from gateway device 402 to operator device 416 via communication component 804 based on information retrieval instructions 608, wherein operator device 416 receives record 610 over external network 124. In some embodiments, record 610 is configured to be housed in memory 704 as stored data 706. As shown in FIG. 8, client managing component 808 accesses and transmits record 610 to operating device 416 based on previously received information retrieval instructions 608.

It is to be understood that the data within record 610 received from gateway device 402 is configured to assist operator device 416 with identifying, analyzing, and rectifying connectivity issues associated with client device 106. In particular, record 610 provides operator device 416 with data that would otherwise require the technician to perform on-site troubleshooting on WLAN 110 in order to be acquired.

Returning to FIG. 5, after the results of the information retrieval instructions are transmitted (S512), method 500 stops (S514).

The operations disclosed herein may constitute algorithms that can be effected by software, applications (apps, or mobile apps), or computer programs. The software, applications, computer programs can be stored in a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A gateway device for use with an operator device and a client device, the operator device being in communication with said gateway device via an external network and being configured to transmit monitoring instructions and to transmit information retrieval instructions, the client device being in communication with said gateway device via a local area network, said gateway device comprising:
a memory; and
a processor configured to execute instructions stored in said memory to cause said gateway device to:
communicate with the operator device via the external network and to communicate with the client device via the local area network;
to receive the monitoring instructions and information retrieval instructions;
to set a medium access control (MAC) address associated with the client device based on the monitoring instructions; and
to monitor non-data frames of the client device based on the MAC address and the monitoring instructions;
wherein said memory is configured to store the monitored non-data frames as recorded non-data frames, and
wherein said processor is further configured to execute instructions stored in said memory to cause said gateway device to transmit the recorded non-data frames to the operator device based on the information retrieval instructions.

2. The gateway device of claim 1, wherein said memory is further configured to store a predetermined number of the recorded non-data frames.

3. The gateway device of claim 2, wherein said memory is still further configured to store the predetermined number of the recorded non-data frames in a first-in, first-out routine.

4. The gateway device of claim 1, wherein said processor is further configured to execute instructions stored in said memory to cause said gateway device to prevent a predetermined type of the monitored non-data frames from being stored as a portion of the recorded non-data frames.

5. The gateway device of claim 1, wherein said processor is further configured to execute instructions stored in said memory to cause said gateway device to monitor at least one of the group consisting of management frames, control frames and combinations thereof.

6. The gateway device of claim 1, wherein said processor is further configured to execute instructions stored in said memory to cause said gateway device to provide a graphic user interface to enable a user to exclude a type of management frame from the recorded non-data frames.

7. A method of operating a gateway device to enable monitoring a client device from an operator device via the gateway device, the operator device being in communication with the gateway device via an external network and being configured to transmit monitoring instructions and information retrieval instructions, the client device being in communication with the gateway device via a local area network, said method comprising:
receiving, via a processor configured to execute instructions stored in a memory, the monitoring instructions;
setting, via the processor, a MAC address associated with the client device;
monitoring, via the processor, non-data frames of the client device based on the MAC address and the monitoring instructions;
storing, into the memory, the monitored non-data frames as recorded non-data frames;
receiving, via the processor, the query; and
transmitting, via the processor, the recorded non-data frames to the operator device based on the query.

8. The method of claim 7, wherein said storing the monitored non-data frames as recorded non-data frames comprises storing a predetermined number of the recorded non-data frames.

9. The method of claim 8, wherein said storing a predetermined number of the recorded non-data frames comprises storing the predetermined number of the recorded non-data frames in a first-in, first-out routine.

10. The method of claim 7, further comprising preventing, via the processor, a predetermined type of the monitored non-data frames from being stored as a portion of the recorded non-data frames.

11. The method of claim 7, wherein said monitoring non-data frames of the client device comprises monitoring at least one of the group consisting of management frames, control frames and combinations thereof.

12. The method of claim 7, further comprising, providing, via the processor, a graphic user interface to enable a user to exclude a type of management frame from as recorded non-data frames.

13. A non-transitory, computer-readable media having computer-readable instructions stored thereon, the computer-readable instructions being capable of being read by gateway device for use with a wireless client device and an operator device and being configured to communicate with an external network, the operator device being in communication with the gateway device via the external network and being configured to transmit monitoring instructions and information retrieval instructions, the client device being in communication with the gateway device via a local area network, wherein the computer-readable instructions are capable of instructing the gateway to perform the method:
receiving, via a processor configured to execute instructions stored in a memory, the monitoring instructions;
setting, via the processor, a MAC address associated with the client device;
monitoring, via the processor, non-data frames of the client device based on the MAC address and the monitoring instructions;
storing, into the memory, the monitored non-data frames as recorded non-data frames;
receiving, via the processor, the query; and
transmitting, via the processor, the recorded non-data frames to the operator device based on the query.

14. The non-transitory, computer-readable media of claim 13, wherein the computer-readable instructions are capable of instructing the gateway to perform the method wherein said storing the monitored non-data frames as recorded non-data frames comprises storing a predetermined number of the recorded non-data frames.

15. The non-transitory, computer-readable media of claim 14, wherein the computer-readable instructions are capable of instructing the gateway to perform the method wherein said storing a predetermined number of the recorded non-data frames comprises storing the predetermined number of the recorded non-data frames in a first-in, first-out routine.

16. The non-transitory, computer-readable media of claim 13, wherein the computer-readable instructions are capable of instructing the gateway to perform the method further comprising preventing, via the processor, a predetermined type of the monitored non-data frames from being stored as a portion of the recorded non-data frames.

17. The non-transitory, computer-readable media of claim 13, wherein the computer-readable instructions are capable of instructing the gateway to perform the method wherein said monitoring non-data frames of the client device comprises monitoring at least one of the group consisting of management frames, control frames and combinations thereof.

\* \* \* \* \*